United States Patent
Rimon et al.

(12) 
(10) Patent No.: US 10,536,728 B2
(45) Date of Patent: Jan. 14, 2020

(54) CONTENT CLASSIFICATION SYSTEM

(75) Inventors: Mori Rimon, Jerusalem (IL); Ram Meshulam, Tel Aviv (IL); Izik Ben-Zaken, Shimshit (IL); Yosi Glick, Yehud (IL)

(73) Assignee: JINNI, Yehud (IL)

( * ) Notice: Subject to any disclaimer, the term of this patent is extended or adjusted under 35 U.S.C. 154(b) by 827 days.

(21) Appl. No.: 12/859,248

(22) Filed: Aug. 18, 2010

(65) Prior Publication Data

US 2017/0164011 A1 Jun. 8, 2017

Related U.S. Application Data

(60) Provisional application No. 61/234,817, filed on Aug. 18, 2009.

(51) Int. Cl.
G01N 33/48 (2006.01)
H04N 21/232 (2011.01)
G06F 16/35 (2019.01)

(52) U.S. Cl.
CPC ......... *H04N 21/232* (2013.01); *G06F 16/353* (2019.01)

(58) Field of Classification Search
None
See application file for complete search history.

(56) References Cited

U.S. PATENT DOCUMENTS

| | | | | |
|---|---|---|---|---|
| 2007/0088727 A1* | 4/2007 | Kindig | .............. | G06F 17/30023 |
| 2007/0250901 A1* | 10/2007 | McIntire et al. | .............. | 725/146 |
| 2008/0270038 A1* | 10/2008 | Partovi | .................. | G06Q 10/00 |
| | | | | 702/19 |

OTHER PUBLICATIONS

Hung, Chia-Chuan, et al. "Tag-based user profiling for social media recommendation." ( Workshop on Intelligent Techniques for Web Personalization & Recommender Systems at AAAI2008. vol. 45. 2008).*
Scaringella et al. "Automatic Genre Classification of Music Content," IEEE Signal Processing Magazine, vol. 23(2), Mar. 2006, pp. 133-141.*
Cattuto et al. "Semantic Grounding of Tag Relatednessin Social Bookmarking Systems," The Semantic Web—ISWC 2008 (2008): 615-631.*

* cited by examiner

*Primary Examiner* — Anna Skibinsky
(74) *Attorney, Agent, or Firm* — Rowen TELS LLC

(57) ABSTRACT

A method includes operating a content crawler over a machine communication network to form a set of input content; operating a mapper on a machine memory comprising the input content to form non-transitory machine logic comprising genes for the content, wherein operating the mapper comprises the application of previously mapped genes for the input content to the mapping of subsequent genes for the input content; and applying the genes to a machine memory storing a database of content from which user recommendations are formed.

10 Claims, 7 Drawing Sheets

CONTENT CLASSIFICATION SYSTEM

PRIORITY CLAIM

This application claims priority under 35 U.S.C. 119 to USA provisional application No. 61/234,817 filed on Aug. 18, 2009, which is incorporated herein by reference.

TECHNICAL FIELD

The present disclosure relates to the classification of content.

BACKGROUND

Presently there is a need for content classification systems that accurately reflect characteristics of the content useful to for enabling consumers to make selections. Current systems lack the capability to provide multi-dimensional classification without extensive manual processing.

Current content recommendation systems typically rely on similarity between users and/or content items as manifested in patterns of consumption and rating. Such approaches achieve reasonable results in certain environments but suffer from limitations.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
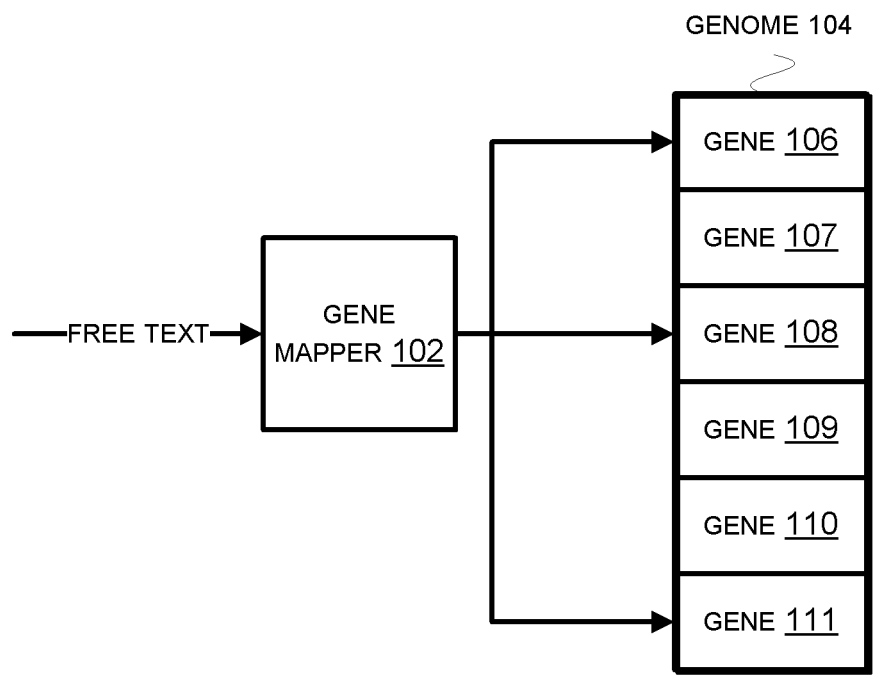
FIG. 1 illustrates an embodiment of a free text gene mapping system.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application.

When the claims use the word "or" in reference to a list of two or more items, that word covers all of the following interpretations of the word: any of the items in the list, all of the items in the list and any combination of the items in the list.

"Logic" refers to machine memory circuits, machine readable media, and/or circuitry which by way of its material and/or material-energy configuration comprises control and/or procedural signals, and/or settings and values, that may be applied to influence the operation of a device. Magnetic media, electronic circuits, electrical and optical memory (both volatile and nonvolatile), and firmware are examples of logic. Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

DESCRIPTION OF BEST MODE AND CERTAIN EMBODIMENTS

Embodiments of a content recommendation system described herein makes use of detailed semantic information about each content item and construct a multi-taste user model. The described approaches allow for a fine-grain characterization of an "entertainment personality", with applications to movie and TV recommendations, personalized TV channels, and internet community functions, to name a few.

The described techniques for recommending content offer advantages over conventional techniques such as collaborative filtering. Collaborative filtering tends to focus on a narrow subset of the catalogue—the more popular titles. In contrast, the semantic approach described herein may consider each and every title. Relying on rating patterns without detailed semantic data, methods like collaborative filtering may miss important differences between users, which are sometimes indicated only by a small number of content characteristics. This might result in selection of wrong titles in a recommendation set. The described techniques avoid inappropriate recommendations of this type even if there was only little evidence for relevant user preferences in the past.

In addition, user-specific "business rules" allow for fine requirements like "don't suggest rough films about future dystopia".

Knowing the topics, style, mood, pace and other important parameters of each content item and each of the user's tastes, produces a better diversified set of recommendations. It is advantageous to control the balance between safe, yet sometimes too obvious, and surprising yet sensible recommendations to present to a user. A semantic-based system, like the one described here, may justify its choices and explain in natural terms why it recommended a certain title to a certain user. Optionally, a short paragraph in plain English may be generated.

The system can produce similarity-based recommendations even when no or few ratings are available (cold start); effective taste-based recommendations may begin with as little as (for example) ten user ratings. The minimum number of ratings required for a content item to be considered may be zero and the minimum number of users required for the system to operate may be one (1). Data sparsity is traditionally one of the main problems of item-based collaborative filtering systems. The personality sketch described herein creates a compact level of abstraction above a raw set of user ratings, which alleviates problems with data sparsity. Representation of the user personality as a set of tastes enables the system to handle data which comes from multiple sources e.g., rating of several users in a household.

Through a combination of logic for linguistic analysis, machine learning, and rule-based heuristics, unstructured free text describing video or other content is mapped to a structured set of category tags (herein: genes), selected from a pre-defined taxonomy (herein: genome). The term "gene" means logic representing a content category, said logic being applied to influence the operation of other logic for classification, recommendation, etc as described herein. The term "genome" means logic comprising data elements and relations among data elements forming a taxonomy. Logic elements described herein transform and represent content logic retrieved via a network interface into genes.

Various logic elements described herein operate to physically transform signals representing human attributes and/or behavior into logic that may be applied to determine signal interactions with said users identifying content recommendations. Various machine elements are employed in the collection of content, interaction among logic elements, and communication of content recommendations. For example, a content crawler may operate via a network interface from one or more computer systems to retrieve and apply content from a data network to a gene mapping logic element. Likewise, a recommendation logic element may operate via a same or different network interface to communicate recommendations to users of the system. Users may communicate content ratings to a user database logic element via a same or different network interface.

Examples of network interfaces and communication technologies include Ethernet, Internet Protocol (IP), Data Over Cable System Interface Specification (DOCSIS), and various wireless communication technologies known in the art.

Various logic elements of the system may communicate with one another over a local area or wide area network, or over a global network such as the Internet. Logic elements that are more co-located may communicate via various bus technologies known in the art. Logic elements may be applied to influence the operation of one or more general purpose or dedicated processor circuits.

In some embodiments users may react to content recommendations by signaling the same or different system for the delivery of the recommended content over a data network.

Overall, systems in accordance with the embodiments described herein may operate as an electronic or optical input/output apparatus, receiving and processing signals representing textual content, user interactions, ratings, and so on, and transform said signals into logic that is itself applied to produce signal outputs representing recommendations. These signal outputs may then be received by users and converted into logic representing display elements on visual devices such as flat screens, printers, and so on, as well as possibly physical outputs in the form of audible signals.

FIG. 1 illustrates an embodiment of a free text gene mapping system. Free text is applied to a gene mapping logic element 102. The gene mapper 102 outputs a genome 104 for the free text. The genome 104 comprises multiple genes 106-111 for the text.

Gene mapping logic 102 maps free text (e.g. a movie review, a post on a discussion forum) to genes 106-111 (e.g. genre, tale, pace, themes). The free text may be obtained by crawling the web for synopses and reviews or other information pertaining to content of interest. Sources of free text include but are not limited to reviews, forum posts, blog posts, articles, stories, single and multiple paragraphs, single sentences, and sets of keywords. Different mapping logic may be employed for different genes. Given free text (e.g. a movie review) describing a content item (e.g. a movie), mapping a particular gene yields a measure (or a set of measures) that estimates how relevant the gene is for the content item. Text may be embodied in many forms, including ASCII, XML, HTML, and other formats known in the art. The genome 104 and genes 106-111 may be embodied as logic in a computing environment.

Mapping may be based at least in part on rules generated from training data. The system learns which text feature combinations are strong indications for each gene, best distinguishing between one gene and the others in the genome.

Video content has some characteristics that complicate classification, such as:
  A complex taxonomy with very fine distinctions.
  Multiple category assignments for training items, unlike simpler classification problems, where each training item is a sample for one or a small number of categories.
  High variability in the amount of samples available per gene.
  Conflicting targets to satisfy, that require a mix of classification methods. Different methods may be selected to best cope with small or large training sets; complex or simple genomes; effects of over-fitting and additional issues.
  High level of ambiguity.
  Large diversity of ways to express similar sentiments.

Hierarchical mapping may be employed to exploit the natural structure of the genome to increase the accuracy of the mapping for certain genes. For example, the results of mapping a gene for high-level themes may be applied to the mapping of genes for particular themes. The features and logic applied in mapping a gene for high-level themes may be different from those applied in the mapper for genes of lower-level themes under the said high-level theme.

The gene mapper 102 may adapt its rules and behavior according to the amount of free text, and/or number of free text items, available for each content item. The mapper 102 may weigh the sources of textual information according to their past correlation with certain genes. For example, if a certain video reviewer has consistently written reviews that are a reliable source of theme genes, genes for themes from those reviews may be mapped with higher confidence. In some cases, a different weight may be given in training to genes whose mapping function performed poorly in the past.

Figure 2:
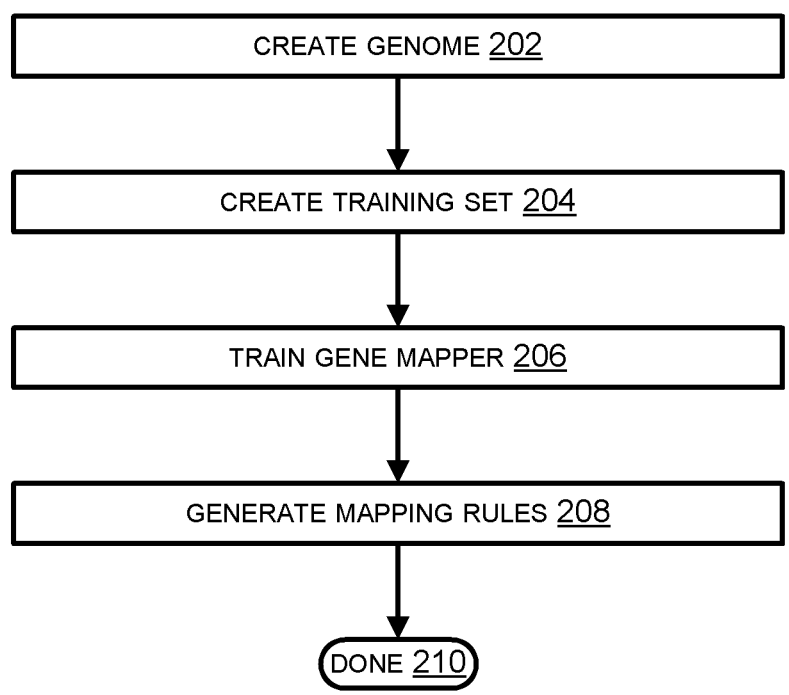
FIG. 2 is a flow chart illustrating an embodiment of a training process.

To prepare the gene mapper, the genome may be created, tuned, and validated. Some manual gene mapping of sample content items may take place, to serve as a training set. The training set may be used to train the mapper and to create mapping logic for each gene. FIG. 2 is a flow chart illustrating an embodiment of a training process. A genome 202 and training set 204 are created and applied to train a gene mapping logic element 206. Mapping rules for various genes in the training set are generated 208. The process concludes 210.

Figure 3:
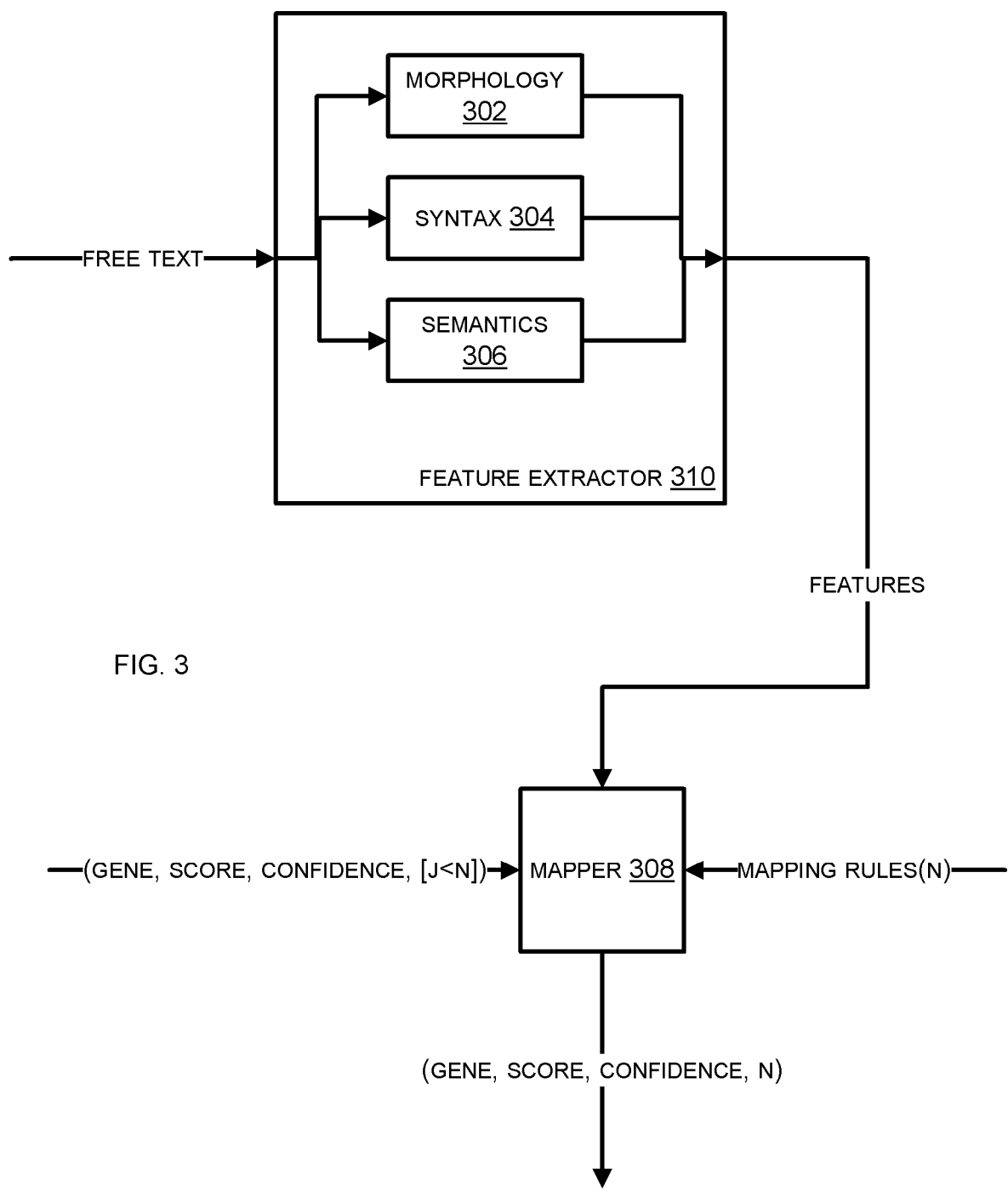
FIG. 3 is an illustration of an embodiment of a gene mapping system.

FIG. 3 is an illustration of an embodiment of a gene mapping system. The gene mapping logic element 308, feature extraction logic element 310, and components thereof may be embodied as logic in a computing environment. To obtain raw information for gene mapping, feature extraction may be performed by extraction logic 310 using linguistic analysis to extract linguistic features from textual sources such as content synopses and reviews. Linguistic analysis may involve morphological normalization (stemming of words to base forms), syntactic analysis (detection of grammatical roles, syntactic relations, multi-word expressions), and semantic analysis (grouping of related terms as high-level concepts). The feature extraction logic 310 may thus comprise morphology logic element 302, syntax logic element 304, and semantic analysis logic element 306. Extracted linguistic features are input to the mapping logic element 308, which may use statistical inference and mapping functions to map certain genes (N) to the content. A mapping of gene to content involves identifying the gene, giving the gene a score (quantifying its relevance to the content), and a confidence (quantifying how confident the mapper is in the relevance metric). The mapper 308 may apply existing mapping rules for the genes and previous gene mappings for the content when forming a subsequent gene mapping.

Applying previously-mapped genes for content to the mapping of subsequent genes for the content is referred to herein as 'cascaded classification'.

A number of mapping strategies may be employed for particular genes. Voting procedures may then be employed to resolve differences of outcome among the several strategies.

The mapper 308 may distinguish between salience scores and confidence values for each gene. Salience quantifies how relevant the content seems to be for the content, and confidence measures the likely quality of the salience measurement.

The mapper 308 may perform sentiment analysis for certain gene mappings. The mapper 308 may employ a multi-dimensional concept of sentiment, including identification of sentiment polarity (negation) from the features extracted from the free text.

Sentiment may be measured for several genes; for each one, the attitude is classified as positive or negative. In some embodiments, subjective sentiments such as 'humorous', 'scary', and 'disturbing' may be measured, even when these genes do not range over the same set of values.

The system may identify states of controversy, as opposed to consensus. One approach is to identify clusters of opposing sentiments in independent free texts.

Known solutions to sentiment analysis employ a basic scheme aimed at determining if the attitude of a given text is in general positive or negative. This is the so-called thumb-up/thumbs-down classification, or some variation thereof. The common techniques are standard text categorization methods, sometimes with very shallow linguistic pre-processing such as identification of adjectives matched against pre-defined lists of positive and negative terms. Results are mediocre, as standard approaches do not cope well with the large diversity of ways to express similar sentiments, the high level of ambiguity in opinion texts, widespread use of negation, comparative expressions, and other complex phenomena.

To improve upon prior approaches to sentiment analysis, free text may undergo several stages of linguistic processing. First, basic features may be extracted. These are word tokens as they appear in the text and their base forms, constructed by stemming (aka: morphological normalization). Extraction of multi-word expressions may also take place. Extraction of complex syntactic features may also occur. This may involve extracting grammatical relations (e.g. a verb and its direct object, an adjective and the noun it modifies) and negation markers (different types of linguistic structures that reverse the polarity of an adjective or verb, thus potentially reversing the polarity of the expressed sentiment).

Creation of semantic features may also take place. This may involve creating word classes that denote higher-level concepts. Each extracted feature may be assigned a unique identifier and a weight.

Discourse structure may be considered when extracting features. For example, the weight may be increased for features that appear in text segments (e.g. paragraphs) deemed to be more important than others.

Text features and their weights may be input to statistical gene mapping functions (for example created from training samples). The result, for each free text, may be a vector of sentiment gene mappings to the genome, with salience and confidence scores.

Sentiment vectors serve multiple purposes. For example, they are useful for consolidation of sentiment findings across free text for the same content item, and determining a collective verdict if there is a high degree of agreement. They are useful for marking of controversy, if a consensus does not exist for some sentiment and a tension is found between contradictory opinions. This may be done separately for each sentiment gene.

Identification of consensus or controversy is more relevant to subjective experience-related genes (such as a sentiment that a video was 'touching', 'disturbing', etc); there is less or no sense of controversy on more objected genes, such as 'plot', for example.

The mapper 308 may calculate two separate values for each gene: salience and confidence. Salience is based on both positive and negative evidences found in the input (e.g. free text) for the gene. It factors out elements that are influenced by the quality of learning during the training process. Confidence is based on only positive evidence and the calculation normalizes figures according to the size of the input. The range of values is not limited to 0-1 like for probabilities.

When processing a new content item, the mapper 308 may use the two values to make decisions. If both are high for a particular gene, the decision will tend to be positive, and if both are low the decision will tend to be negative. To cope with less clear-cut and more frequent cases, the mapper 308 may employ a weighted geometric mean, with minimum and maximum cutoff values. The weights and cut-off values may vary by gene and the specific input. For example, mapping may be more liberal if only a small number of relevant genes are identified and if Recall is considered more important than Precision in the specific run (external parameter).

Figure 4:
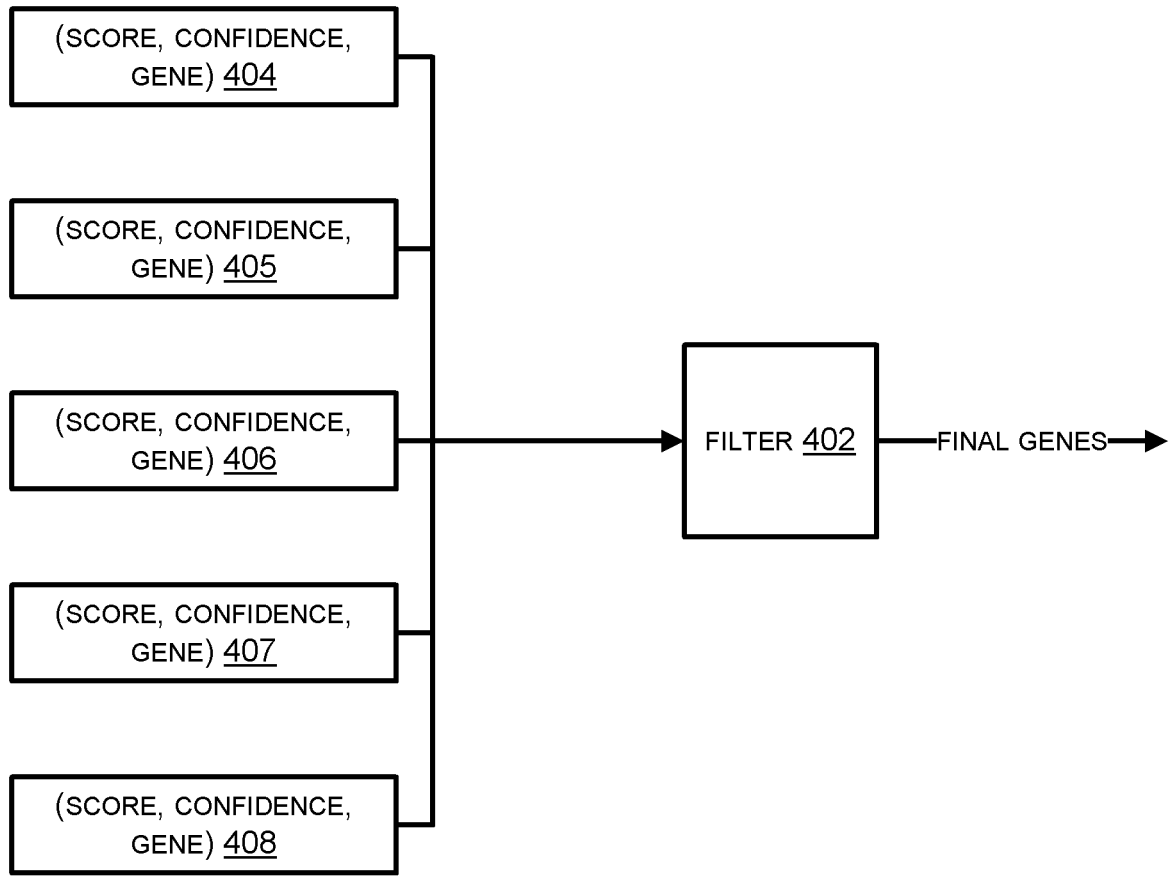
FIG. 4 illustrates an embodiment of a system to filter genes using score and confidence values for the genes.

Mapping decisions may be further tuned using heuristic rules, which reflect experts' insight. In theory, any hidden relation between categories should have been discovered in training, but in practice this is far from being true in light of the sparseness of training data. One approach allows for incorporation of "human wisdom" in addition to automatic inferences from training. A refined salience value may be the basis for a score attached to each category, reflecting its prominence in the given content (for example expressed in 3 levels: high, medium and low). FIG. 4 illustrates an embodiment of a system to filter genes using score and confidence values for the genes. A set of genes 404-408 and associated scores and confidence values may be applied to a filter logic element 402. Gene mappings may be refined (e.g. filtered) using rules and heuristics to resolve conflicts and set final genes, each with a score and a confidence value. Rules may be either automatically-deduced or defined by experts. Filtering may take into account relations between genes and levels of source reliability. The filter 402 may be embodied as logic in a computing environment.

Relationships may exist between genes of the genome. For example, in video content, certain plot themes are more likely to appear in certain genres. Also, within the same type of category (e.g. plot themes) some genes are closer in meaning to some others and rather distinct from most other genes. Ignoring such content phenomena or relying completely on the learning scheme to discover all hidden relations may be detrimental to the final gene mapping accuracy of free text.

Figure 5:
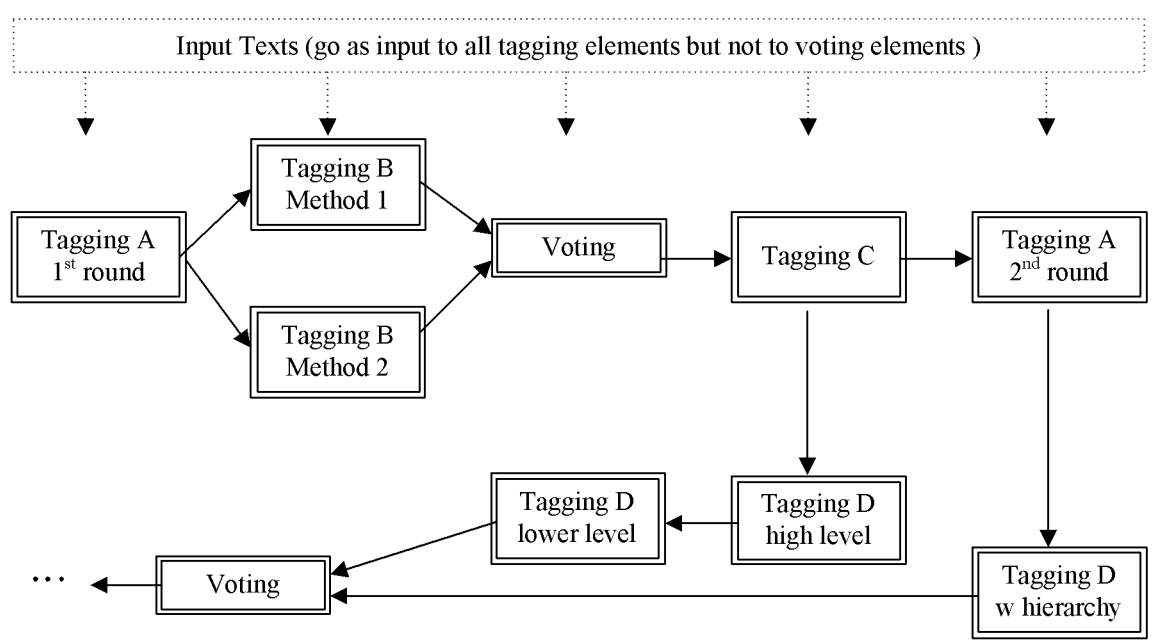
FIG. 5 illustrates an embodiment of cascaded mapping logic.

To account for relationships among genes, the genes are organized in a taxonomy (the genome) which distinguishes between category types (e.g. genres, themes, sentiments, pace, time, place, audience, etc. for video content) and allows for a hierarchy within selected types (e.g. high-level plot themes>regular themes>finer themes). FIG. 5 illustrates an embodiment of cascaded mapping logic. The gene mapper 102 may be designed as a cascade of procedures, each dealing with at least one category type. Gene mappings produced in one procedure (e.g. themes, Tagging element A) may serve as input in the mapping of another category type down the cascade (e.g. audience, Tagging element B). Tagging elements C and D represent other category types, in general. Multiple tagging elements taking different approaches may be applied at various stages of the cascade, and a voting logic element may be applied after a stage to select a set of tags to apply at subsequent stages.

Hierarchical classification versus serial processing may be applied. Each approach has advantages and disadvantages: The hierarchical scheme breaks down the gene mapping problem to smaller problems, allowing for better and more specific features to be used for each subset; however, it may be too strict in some circumstances, ignoring some or all lower level nodes of a category that was not detected. A serial scheme acknowledges the fact that relations are almost never clear-cut (e.g. a plot theme that is more likely to appear with a certain genre may still appear with others).

A cascaded scheme allows for repetitions of tagging methods, e.g. first tag for type A then use the output in the tagging of type B and later re-tag A using the output of B (among other inputs).

Some implementations may involve several mapping methods for the same gene, using different methods, and a final "voting process" on the suggestions of these methods. Voting may apply weights on the different methods, according to the history of their mapping quality.

Enforced learning may apply, based on feedback from manual quality assurance of generated genes. Repeated mistakes by the mapper can be thus corrected, applying the relevant input again with increased weights for re-learning.

Processing Tagged Content

Figure 6:
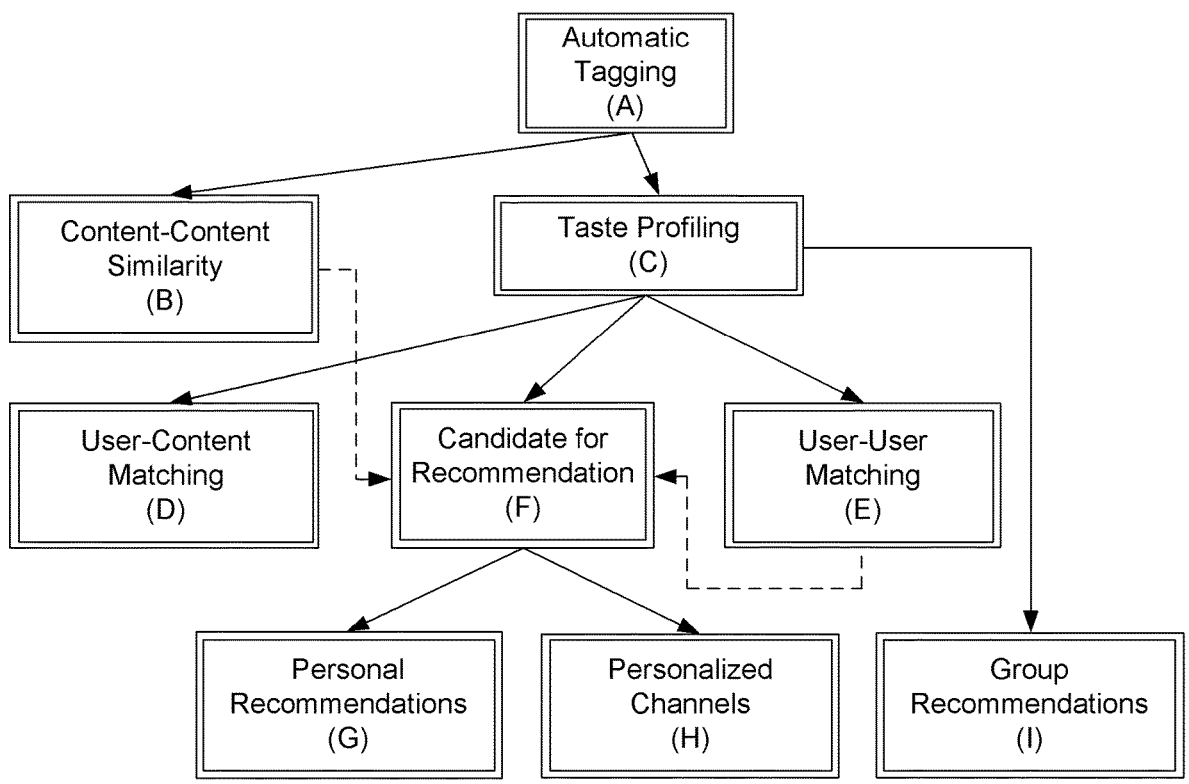
FIG. 6 is an illustration of an embodiment of relations and dependencies between different processes in one system embodiment.

Processes for classifying, rating, selection, and recommendation of content include:

A. Tagging
B. Calculation of content similarity
C. Semantic profiling of user tastes
D. Prediction of a user rating for content items
E. Taste-based calculation of similarity between users.
F. Selection of a subset of available content items as candidates for recommendation to a given user
G. Scoring of candidate items and generation of a prioritized recommendation list for a given user
H. Automatic generation of personalized channels for individual users and households
I. Group recommendations FIG. 6 is an illustration of an embodiment of relations and dependencies between different processes in one system embodiment. Dashed connectors mark an optional dependency, for example due to variations of the method that selects candidates for recommendation.

Figure 7:
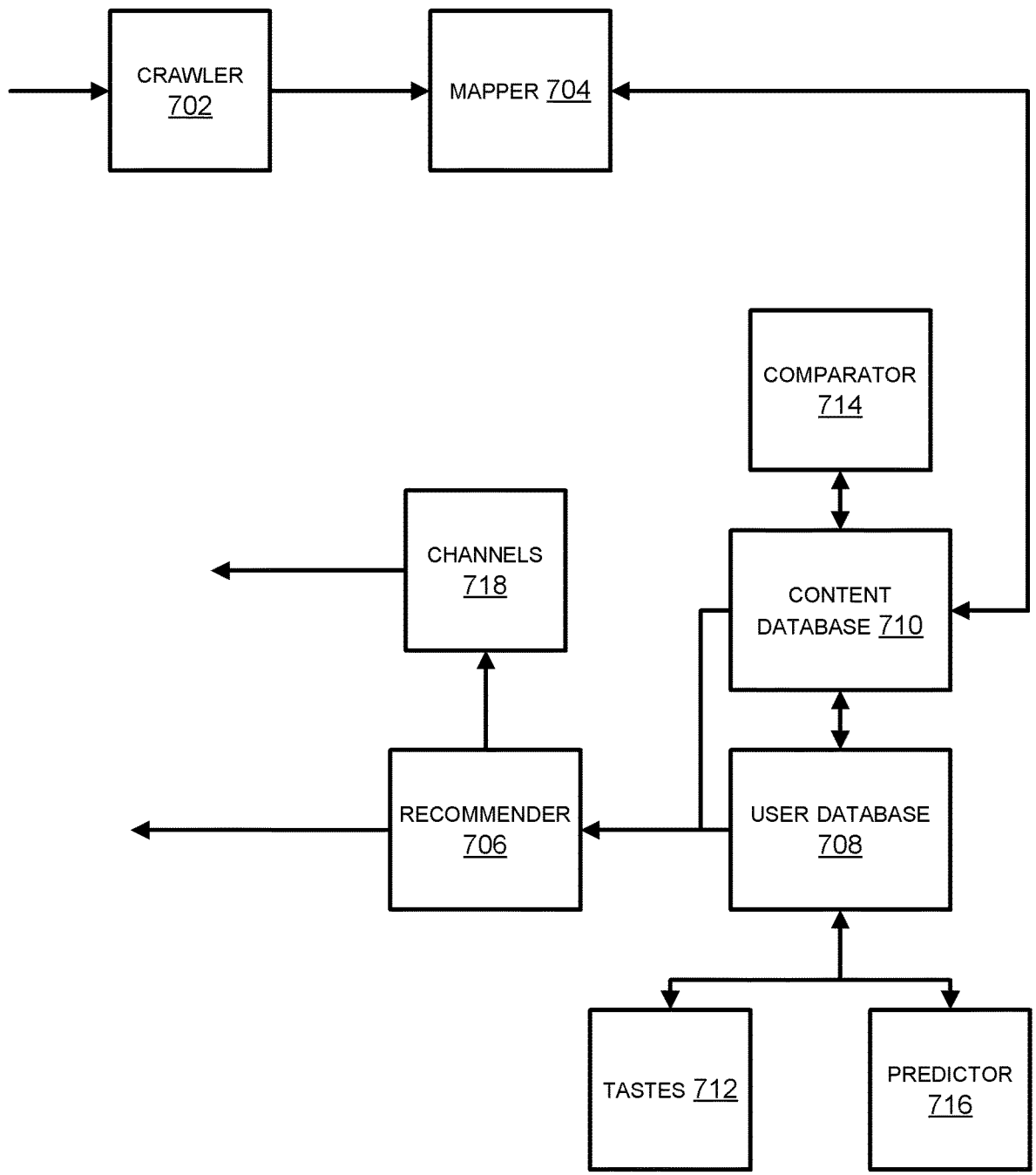
FIG. 7 is an illustration of an embodiment of a content classification and recommendation system.

FIG. 7 is an illustration of an embodiment of a content classification and recommendation system. The system comprises a network content crawler 702 providing content to mapping logic element 704. Genes and a genome are built from the mapper 704 and stored along with the content or references to the content (pointers, URLs, file names, etc) in the content database 710. A comparator 714 may identify similarities between content items as described below. A user database may include ratings, tastes, and other information for users and groups of users. Taste logic element 712 may determine a user's content tastes based on their ratings, consumption habits, demographics, and/or other considerations as described below. A prediction logic element 716 may predict how a user would rate content based on their tastes, their taste neighbors, and/or other considerations and described below.

In operation, the system may communicate with one or more external computer networks. Signaling from the crawler 702 to the network may result in the identification of content to apply to the mapper 704. The mapper 704 may operate to produce logic in the content database 710 forming a genome and/or genes for applied content. As described below, logic is formed in the user database 708 reflecting the user's content tastes. The recommender logic element 706 applies this user logic and logic of the content database 710 to identify content recommendations. These content recommendations are communicated to users of the system via a same or different network than the network(s) from which content was crawled. These recommendations may be formed into channels for the user or user groups as described below.

The content that is crawled and applied to the mapper 704 is not necessarily the content that is recommended. For example, video content, stored as one or more stream files (logic comprising the video content in machine-readable memory(s)) may have related textual content stored in the form of data files on various and unrelated servers of the crawled communication network(s). The textual content may be crawled, processed into logic representing genes, tastes, and so forth, and result in the generation of recommendations for the related video content communicated via the same or different network(s) to users.

Recommendation logic element 706 generates recommendations for users and/or groups of users. Recommendations may be formed into channels for users or groups of users by channel formation logic 718. Embodiments of these features are described below.

Embodiments of Process A, Tagging, has been described supra. An output of this process may be a vector of content tags (genes), including for example genes for genres, themes, sentiments/mood, style, look, attitude, pace, time, places, target audience, and music score. A salience value may be attached to each gene, expressing the gene's significance for a particular content item.

Content Similarity

Similarity between two content items may be determined using a mathematical distance function between two vectors of content genes. Depending on the application one or more of the following parameters may be taken into account:

- The amounts of identical genes and different genes in the two vectors.
- The salience (significance) of each gene in each of the given content items.
- The frequency of each gene in the catalogue (rarely-used genes are more indicative than commonly-used ones and therefore get a higher weight).
- Relations between genes (two different genes may still contribute to similarity if they are semantically related).
- The relative importance of each category type (e.g. genres, themes, sentiments) for similarity, as deduced by a best-fit analysis and confirmed or tuned by content experts.

The following is an example process for determining content similarity. Let P and Q be two content vectors. Assume that cells with 0 values in the same position in the two vectors are removed and now P and Q are both of length n. In these reduced vectors, for each position i=1, ..., n; $0 < P_i \le 1$ and/or $0 < Q_i \le 1$; the values of Pi and Qi represent the salience of the gene in position i in the content items described by P and Q.

Each gene belongs to one of several categories (genome sections). Each category has a weight between 0 and 1 signifying its relative importance for similarity. Denote by Ci the category weight of the gene in position i.

Let Ri be the weight of the gene i considering its rareness in the catalogue or in a relevant subset thereof. One of several possible ways to calculate Ri is by the formula:

$$Ri = [\text{Max}(Tk) - (\text{no. of items carrying gene } i) + 1] / [\text{Max}(Tk) - \text{Min}(Tk) + 1]$$

where Tk is a variable denoting the number of titles with gene k in the relevant (sub)set. Max and Min are calculated over all k.

Define Sim(P,Q), the degree of similarity between P and Q, as follows:

$$\text{Sim}(P,Q) = \Sigma_{i=1,\ldots,n}(1 - |Pi - Qi|) \times Ci \times Ri \times TU(Pi, Qi)$$

where TU is a tuning function which allows to stress or relax the effect of salience differences. Different tuning functions may apply in different implementations. The following TU function may be effective in certain applications:

$$TU(Pi, Qi) = 2 \times \sqrt{(\min(Pi, Qi))} \quad (\sqrt{} \text{ stands for the square root function}).$$

Another variation may apply a fixed multiplication factor α but only in cases where both Pi and Qi are non-zero. Yet another variation may apply a log function, e.g. $Pi \times \log(Pi/Qi)$ for non-zero Qi. This yields an asymmetric similarity function, which may be useful in certain circumstances.

Relations between genes are not reflected in the Sim function above. This may be accounted for by considering not only (Pi,Qi) pairs but all (Pi,Qj) pairs and a matrix R where the element Rij indicates if and to what degree gene i and gene j are related.

Depending on the application, one may want to normalize the similarity function so its values range over a desired interval, e.g. [0,1]. This may be done as a final step after computing Sim(P,Q). Details depend on the application and the distributions of the parameters n, Ci and Ri.

Taste Profiling

People may enjoy different types of content in different circumstances. It may be desirable to model multiple tastes for a single user and even more so for a household. An "entertainment personality" may not always be modeled effectively just by a raw set of ratings. Certain content attributes (genes, in our terminology) may have a more important role than others in determining a specific user taste and differentiating it from others.

In one embodiment semantic vectors of content items that a user rated are grouped in clusters. Each cluster represents one user taste and the set of all tastes for a given user represents the user's "entertainment personality". The following is one of several possible implementations:

Archetype-Tastes Calculation

This operation may be executed once and repeated only when the catalogue or the "genome" (set of genes and categories) are significantly updated. Define a set of 'archetype' taste types, denoted P. Each archetype taste type is defined by a set of k items which best represent it: $P\_i\{Pi1, Pi2, \ldots, Pik\}$. Each item may be defined as a vector of semantic genes, as explained for the content tagging process supra. Define a subset of "core genes" which will be used in the taste calculation process. Genes outside this set are ignored by all taste related processes. For each $P\_i$, define the archetype taste $P^c\_i$, as the average vector of Pi.

Personality Sketch Calculation

This operation may be executed every time the user rates a significant amount of items since the last taste calculation process was executed for the user. Let R be a set of items the user has loved; i.e. has rated favorably (above a certain threshold) or marked as a favorite item in some application or gave any other explicit or implicit positive input about it. Apply any variant of the k-Nearest Neighbors method or other general-purpose clustering algorithms on R. Use P as the initial set of centroids for the algorithm. For each cluster, define 'taste significance' as the percentage of items which are part of the cluster out of the total number of items that the user loved (as defined above). Discard clusters which have taste significance lower than a certain threshold. Set genes which have a value lower than a certain threshold to zero (effectively discarding them from the cluster). Each cluster (the centroid of the cluster with a measure significance) represents one user taste. The set of all tastes for a given user represents a personality sketch.

The entertainment personality has desirable properties: It is a compact model of the user preferences. Each taste is a vector in the gene space. Thus, it is relatively easy to measure the distance between a user taste and a single content item (content items are represented as a vector of genes. It is relatively easy to compare two users by comparing their personality sketches.

Personality Sketch Representation

A user personality sketch is presented as a set of tastes, ordered by relative significance. Each taste may be presented by a subset of the most significance genes, with their relative weights. In addition, a taste can be illustrated by a short list of content items that are most representative of this taste and best match the presented genes. Each taste can be measured for similarity versus any given title. A personality sketch of a user (i.e. the collection of his or her tastes) can be measured for similarity versus personality sketches of other users.

Your Match

The "Your Match" function predicts the user rating for a given content item. The content item and the user's tastes are represented as semantic vectors: genes with or without salience values. The primary criterion for the "Your Match" function is the distance between the vector of the given content item and the vector representing the user's closest taste. Additional criteria may be used as described below.

Auxiliary Function f(d)

The auxiliary function f(d) may be calculated periodically for the whole database (an off-line process). For a set of users U, create a vector of pairs <r, d> where r is the rank of a user for an item, and d is the distance of that item from that user. Use a regression technique to infer a function $f(d)$ which maps from a distance d to a rank $\hat{r}_i$ for item i.

Actual Your-Match Calculation

For each requested pair (user u, item i), calculate the semantic distance d(u,i) between the vector of the given content item i and the vector representing the closest taste of user u. Use the auxiliary function $f(d)$ to map the distance d(u,i) to a rank $\hat{r}_i$. The final your-match prediction is the inferred rank $\hat{r}_i$. It may be boosted or decreased according to additional criteria, which include but are not limited to: (a) average community ranking for the predicted item, (b) the average ranking of the user, (c) the average ranking of the user for content items related to the relevant taste, (d) the average ranking of the content-item by "taste-neighbors" (Process E), (f) the average ranking of the user for similar content items.

A change is made by adding (or subtracting) a weighted boost to $\hat{r}_i$. For example, a your-match prediction which takes into account the average community ranking for i, may be:

$$m(\bar{r}_i, \hat{r}_i) = \hat{r}_i + w(\bar{r}_i - \hat{r}_i) \text{ where } \bar{r}_i \text{ is the average community ranking for item } i.$$

Taste Neighbors

Given the personality sketches of two users, a neighbor-distance function is defined between the two personalities. When the distance is smaller than a certain threshold, the users are considered 'taste neighbors'. The distance function takes into account two factors, using different representations of taste information: (a) Overall similarity between sketches, i.e., the set of taste vectors is treated as one long vector and distance is calculated between two such vectors of the users, and (b) Specific taste similarity, i.e. distances are calculated between each taste of one user and the matching taste of the other user.

Formally, given a user u with taste vector T={$t_1$, $t_2$, ..., $t_n$} and another user u' with a corresponding taste vector T', the neighbor-distance is defined as:

$$s(u, u') = c_1 \cdot d(T, T') + c_2 \cdot \sum_{i=1}^{|T|} w_i \cdot d(t_i, t'_i)$$

$c_1$ and $c_2$ are constant weights. $w_i$ is an optional weight which reflects the average taste significance of u and u' (taste significance is described in process C step 2).

Users with a small neighbor-distance are considered close neighbors. A related "community function" is an automatic detection of "taste neighbors", using the process described above, and cross-recommendations as detailed in the description which follows.

Content Selection

Selection of a subset of available content items as candidates for recommendation may be done in several ways. The verb "loved" is used herein to denote any situation in which the user has rated a content item favorably (i.e. above a certain threshold) or marked it as a favorite item in some application or gave any other explicit or implicit positive input about it.

One technique involves the following acts: (a) Fetch the taste-neighbors of the given user (distance from taste clusters); (b) For each taste-neighbor, get content items which the neighbor loved, (c) Unify the content items to one set.

Another technique proceeds as follows: (a) Fetch the content items that the user loved; (b) For each item, find similar items; (c) Unify the content items to one set.

Yet another technique proceeds as follows: (a) Fetch the content items that the user loved; (b) Group the content items in taste clusters, deciding on cluster association by shortest distance (i.e. a content item is included in a taste cluster i if it is closer to i than to any other taste cluster); (c) For each group, find similar content items.

The first two techniques return one set of results, and the third technique returns a set of results for each taste. However, if another process requires a unified set of results, the results of the third method may be unified. If another process requires the results to be per-taste, the results of the first two methods may be divided per taste: a content item is included in taste group i if it is closest to taste i.

The first method, which is based on neighbors' ratings, tends to return a more conventional ("mainstream") set of content items. Such results will cause fewer disappointments for the user. On the other hand, the overall set might be considered less interesting. Another feature of the first method is that it may experience cold-start problems (like other user-based solutions). The second and third methods are not biased toward mainstream and return a more diverse and interesting set of results, but take the risk of less accurate recommendations. The second and third methods do not suffer from cold-start problems. A joint approach may create two sets of recommendations, one from each method and return a joint set of results where some of the recommendations are more mainstream (the first method) and some are more interesting (the second and third methods).

Recommendations

This process generates a set of content items to be actually recommended to a given user. Inputs to this process may be either a set of candidate items or a set of sets of candidate items. The input may be sorted and prioritized according to the following criteria (weights may be assigned to reflect different preferences in different applications):

(a) The distance from the closest user taste. This constitutes the base score. The distance function may or may not be Euclidean, i.e. measuring the distance between the gene vector of the content item and the taste centroid. Another representation for both vectors may take the significance of each gene into account, for example by multiplying the value of each gene in the vector by its tfidf frequency measure (see below).

(b) Explicit preferences of the user, the household or the service provider ("business rules").

(c) Implicit preferences of the user or the household, as deduced from past behavior (e.g. the percentage of new vs. old titles, popular vs. "long-tail", etc.).

(d) A balanced representation of tastes—proportional to the weight of each taste in the group of tastes for the given user or household (i.e. the relevant personality sketch).

For example, given a personality sketch T and a set of candidate items C (in this example assume that the candidate list was not created per-taste) one may score and choose a set of recommendation for the user as follows:

(1) Set an empty result list R, (2) remove from C any items which violate business rules defined by the user, the household or the service provider, (3) for each taste in T: (a) remove all genes with a value lower than a pre-defined threshold, (b) calculate a score for each item in C. Formally, given an item m and a taste t, the score of m in the context of t may be set to:

$$score_m^t = \sum_i^{genes} \begin{cases} (m_i > 0) \wedge (t_i > 0) & tfidf(t_i) \\ (m_i > 0) \wedge (t_i = 0) & -g \cdot tfidf(m_i) \end{cases}$$

where $t_i$ and $m_i$ are the values of category i on t and m respectively, and g is a penalty factor. tfidf is the common ratio between total frequency and group-specific frequency. Other formulas may apply to fit application-specific precision and diversity targets.

(4) As long as R contains less than the required count of items, do: (a) choose a taste t from T. Use a weighted random function which reflects the taste significance of each of the user tastes, (b) from C, choose and remove the item m with the highest score in the context of t, (c) if adding t to R violates an implicit preference of the user, go to step 4b.

(5) Items in R are now sorted by score. Optionally apply application-specific and/or user-specific criteria to move items up or down the list. R now contains the final recommendation set to be presented to the user. The recommendation decisions can be justified and explained to the user in natural terms, using genome-based expressions. Optionally, a short paragraph in plain English may be generated.

Personalized TV Channels

Personalized TV Channels is an application that applies the recommendation algorithms to content items gathered from a weekly TV schedule (linear programming), video on-demand (VOD) offerings, items recorded on a personal video player (PVP) in a TV set-top box and media content on a personal computer, for example. The result is a linear "playlist" with items from all the available sources. Multiple playlists can be created for a customer (individual or household). Some differences from regular recommendations are that the candidates for recommendation are all the items that match a customer request, expressed for example as a pointer to one of the pre-calculated tastes of the customer. The user may have a page which contains a representation of his or her personality sketch. Each taste representation there is selectable. The user request may also be expressed as a search expression, using semantic gene terms and Boolean functions (e.g., "An exciting movie about a master villain with special effects but no violence"), or as a reference to a specific content item as a model (a "more like this" query).

Prioritization is determined by time constraints. The best recommendation is calculated separately for each time slot (the definition of time slots and their length is application-dependent). Content diversity can be maintained not only in the list of recommendations as a whole, as the taste-based process G does, but also in terms of the linear order of viewing.

Customers may create new channels, delete old ones or keep channels for as long as they wish. Playlists are calculated periodically for all active channels. Note that in a typical household, content may be (anonymously) rated by multiple residents. Recommendations based on such unsorted set of ratings may be poor. Using personality sketches divides the consumed content to segments (tastes), enabling users to choose channels of recommended content which are based on a subset of the consumed data.

Group Recommendations

Group recommendations take into account the tastes of several people (e.g. in the same household or an occasional get-together). To calculate a joined taste for a group of users, one approach first finds a set of tastes, one taste from each user, such that the overall mutual distances between each pair of tastes is minimized. Then, determine the group's joined taste, which is an average of the selected tastes. The process can be repeated to generate more than one joined taste.

In one approach the joined taste(s) are determined and then a prioritized list of content recommendations for the group is created, for example using the techniques described supra.

Another type of recommendations involving more than one person is the identification of "taste neighbors". Given one user, the system identifies others with similar tastes, as detailed for example supra. Then it suggests content items that one of the users liked and the other hasn't seen yet or that both users haven't seen and are likely to enjoy. The similarity between neighbors can be explained in natural terms, by a presentation of genes which are relevant to the tastes of both users, are not too general and not too specific, and illustration of the similarity by content items that well represent the relevant gene combination and that both users know and like. Optionally, a short paragraph in plain English may be generated.

Weights can be added to the calculation of the group taste to reflect additional input of the group; for example, a weight of each taste in the personality sketch of each user.

Variations and Alternatives

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. An apparatus to transform textual content from content files, received over a machine network, into display elements forming an operable user interface on a machine display customized to a specific user;
   wherein the content files are selected from the group consisting of content gathered from a weekly TV schedule, video on-demand offerings, and items recorded on a personal video player,
   the apparatus comprising:
   an input to receive the files from a web crawler;
   a mapper operable on the received files to generate a gene vector for each file;
   a comparator to determine a similarity between the files by comparing a gene vector P and a gene vector Q for pairs of the files, wherein Pi and Qi represent a salience of the gene in corresponding position i of the vector P and the vector Q;
   wherein each gene in the vectors is assigned to a category having a weight Ci between 0 and 1 signifying the category's relative importance for determining similarity;
   each gene having a weight Ri based on its rarity;
   the comparator determining a degree of similarity between the pair of files, as follows:

$$Sim(P,Q) = E(1 - |Pi - Qi|) \times Ci \times Ri \times TU(Pi, Qi)$$

where TU is a tuning function for the effect of salience differences between Pi and Qi on the degree of similarity; and
a display generator to apply the degree of similarity to selecting the display elements thus forming the operable user interface with a subset of operable content controls of high relevance and confidence for the specific user.

2. The apparatus of claim 1, further comprising:
the mapper to apply a plurality of mapping strategies; and
the mapper to employ voting procedures to resolve differences of outcome among the plurality of mapping strategies.

3. The apparatus of claim 1, further comprising:
the mapper distinguishing between salience scores and confidence values for each gene.

4. The apparatus of claim 1, further comprising:
the mapper identifying discourse structure from the linguistic features of the files; and
the mapper increasing a weight applied to the linguistic features that appear in discourse structures rated higher than others to a relevance of each gene.

5. The apparatus of claim 1, further comprising:
the mapper tagging a particular file of the files with one or more sentiment gene, reflecting subjective experience-related expressions in multiple free text sources referencing content of the particular file;
the mapper determining collective verdicts for the sentiment gene if there is a high degree of agreement among the free text sources in regard to the content of the particular file; and
the mapper marking the sentiment gene with a controversy indicator if a consensus does not exist among the free text sources in regard to the content of the particular file.

6. The apparatus of claim 5, further comprising:
the collective verdicts reflecting sentiment negation of the content of the particular file.

7. The apparatus of claim 1, further comprising:
the mapper applying filtering to the genes to associate a score and a confidence value to each of the second genes.

8. The apparatus of claim 1, further comprising:
the mapper organizing the genes in a taxonomy which distinguishes between content category types and comprises a hierarchy within the content category types.

9. The apparatus of claim 1, further comprising:
the mapper organized as a cascade of machine procedures, each procedure in the cascade of machine procedures configured to map at least one content category types to gene mappings; and
the gene mappings for a first content category type produced in a first machine procedure at a first stage of the cascade of machine procedures utilized to produce next gene mappings for a second content category type in a second machine procedure at a second stage of the cascade of machine procedures latter to the first stage.

10. The apparatus of claim 1, further comprising:
the mapper generating a reference semantic vector for a reference set of input content previously rated by the specific user;
the mapper grouping the reference semantic vector into taste clusters wherein each of the taste clusters represents one of multiple tastes of the specific user; and
the mapper building a taste profile based on the multiple tastes of the specific user.

* * * * *